F. J. HOYT.
Hat-Mirror.

No. 201,016.  Patented March 5, 1878.

WITNESSES:
Henry N. Miller
C. Sedgwick

INVENTOR:
F. J. Hoyt
BY Munn & Co
ATTORNEYS.

UNITED STATES PATENT OFFICE.

FREDERICK J. HOYT, OF NEW YORK, N. Y.

IMPROVEMENT IN HAT-MIRRORS.

Specification forming part of Letters Patent No. 201,016, dated March 5, 1878; application filed January 23, 1878.

*To all whom it may concern:*

Figure 1:
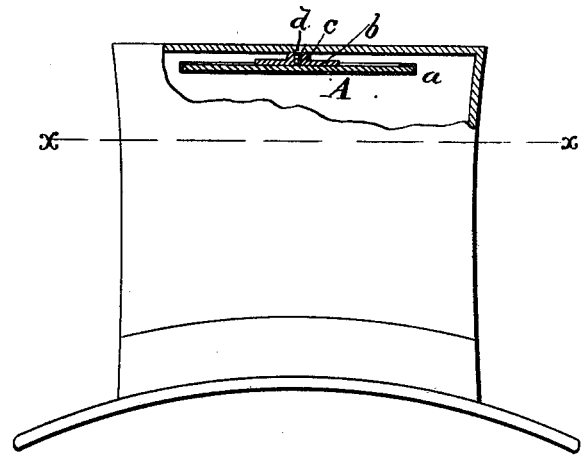
Figure 2:
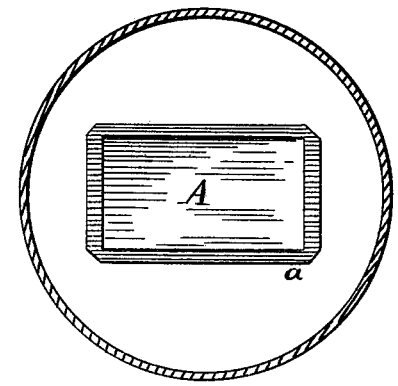
Figure 3:
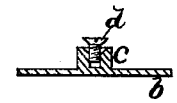

Be it known that I, FREDERICK J. HOYT, of the city, county, and State of New York, have invented a new and Improved Hat-Mirror, of which the following is a specification:

Figure 1 is a side elevation, partly in section, of a hat having my improved mirror attached. Fig. 2 is a horizontal section taken on line $x\ x$ in Fig. 1, looking toward the crown of the hat. Fig. 3 is an enlarged detail view of the mirror-fastening.

Similar letters of reference indicate corresponding parts.

The object of my invention is to provide a fastening device for hat-mirrors, by means of which the mirror may be readily attached to the inner surface of the crown of any hat.

My invention consists in a plate attached to the back of the mirror by means of a suitable cement, the said plate being provided with a boss, in which there is a countersunk screw-hole for receiving the screw that fastens the mirror to the hat.

Referring to the drawing, A is a mirror, which may be of any desired form or size. A cloth or paper binding, $a$, is attached to the edge of the mirror, and the back thereof is protected by a coating of varnish.

A metallic plate, $b$, having a boss, $c$, is attached to the back of the mirror by means of any suitable cement. There is a countersunk screw-hole in the center of the boss $c$ for receiving the screw $d$, by which the mirror is attached to the hat.

A small hole is made in the center of the crown of the hat to receive the fastening-screw $d$, which draws the material of the hat-crown into the countersunk hole in the boss $c$, so that only the face of the screw-head is observable.

By means of my improved fastening a mirror may be attached to a hat of any description. The fastening supports the mirror from a single point, so that it will yield whenever the hat receives a sudden shock by falling or otherwise, and thus obviate the breaking of the glass.

Having thus described my invention, I claim as new and desire to secure by Letters Patent—

1. The mirror-fastening consisting of the plate $b$, having a boss, $c$, provided with a countersunk screw-hole, and the screw $d$, fitted to the said screw-hole, substantially as specified.

2. The combination of the mirror-fastening with the mirror, when the said fastening is attached to the mirror by means of cement, as herein described.

FREDERICK J. HOYT.

Witnesses:
   C. SEDGWICK,
   GEO. M. HOPKINS.